US012564227B2

(12) United States Patent
Zhang et al.

(10) Patent No.: US 12,564,227 B2
(45) Date of Patent: Mar. 3, 2026

(54) RATE-SENSITIVE PROTECTIVE APPAREL

(71) Applicant: Nano and Advanced Materials Institute Limited, Hong Kong (HK)

(72) Inventors: Kang Zhang, Hong Kong (HK); Shilong Zhang, Hong Kong (HK); Pak Chung Lau, Hong Kong (HK); Meishan Chan, Hong Kong (HK); Jifan Li, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 213 days.

(21) Appl. No.: 18/346,873

(22) Filed: Jul. 5, 2023

(65) Prior Publication Data

US 2024/0008564 A1 Jan. 11, 2024

Related U.S. Application Data

(60) Provisional application No. 63/358,860, filed on Jul. 6, 2022.

(51) Int. Cl.
*A41D 13/015* (2006.01)
*A41D 13/06* (2006.01)
(Continued)

(52) U.S. Cl.
CPC ........... *A41D 13/015* (2013.01); *A41D 13/06* (2013.01); *B32B 3/04* (2013.01); *B32B 5/26* (2013.01);
(Continued)

(58) Field of Classification Search
CPC ........ A41D 13/015; A41D 13/06; B32B 3/04; B32B 5/26; B32B 7/14; B32B 33/00;
(Continued)

(56) References Cited

U.S. PATENT DOCUMENTS 8,679,047 B2 3/2014 Holt et al.
9,193,890 B2 11/2015 Holt et al.

FOREIGN PATENT DOCUMENTS

CN 102692161 A * 9/2012
CN 104213322 A * 12/2014
CN 105881940 A * 8/2016 ............... B29D 7/00

OTHER PUBLICATIONS

Paul T. Nenno et al., "Rate-dependent extensional "dynamic ligaments" using shear thickening fluids", U.S. Army Research Laboratory, Materials and Manufacturing Sciences Division, Aberdeen Proving Ground, MD, USA21005, Active and Passive Smart Structures and Integrated Systems, 2014 Downloaded From: http://proceedings.spiedigitallibrary.org/.
(Continued)

*Primary Examiner* — Gerard Higgins
(74) *Attorney, Agent, or Firm* — IDEA Intellectual Limited; Sam T. Yip

(57) ABSTRACT

A rate-sensitive protective apparel including an outer fabric shell, first and second sealing material layers positioned within the outer fabric shell, and a shear thickening fluid core disposed between the first and second sealing material layers is provided. The sealing material layers have fibers extending towards the apparel interior and enmeshing the shear thickening fluid core, and the shear thickening fluid directly contacts with the sealing material and the fibers.

9 Claims, 20 Drawing Sheets

10

110

120b
122b
130
122a
120a

110

(51) Int. Cl.

| | |
|---|---|
| *B32B 3/04* | (2006.01) |
| *B32B 5/26* | (2006.01) |
| *B32B 7/14* | (2006.01) |
| *B32B 33/00* | (2006.01) |
| *B32B 37/12* | (2006.01) |
| *F41H 5/04* | (2006.01) |

(52) U.S. Cl.
CPC ................ *B32B 7/14* (2013.01); *B32B 33/00* (2013.01); *B32B 37/1292* (2013.01); *B32B 2255/02* (2013.01); *B32B 2255/26* (2013.01); *B32B 2262/00* (2013.01); *B32B 2305/18* (2013.01); *B32B 2307/56* (2013.01); *B32B 2437/00* (2013.01); *F41H 5/0478* (2013.01)

(58) Field of Classification Search
CPC ........... B32B 37/1292; B32B 2255/02; B32B 2255/26; B32B 2262/00; B32B 2262/16; B32B 2305/18; B32B 2307/56; B32B 2437/00; B32B 2571/00–02; F41H 5/0478
See application file for complete search history.

(56) References Cited

OTHER PUBLICATIONS

Paul T Nenno et al., "Design and properties of a rate-dependent 'dynamic ligament' containing shear thickening fluid", US Army Research Laboratory, Aberdeen Proving Ground, MD 21005, USA, IOP Publishing, Smart Materials and Structures, 23(2014) 125019 (10pp), isea, 2014 doi:10.1088/0964-1726/23/12/125019.

Emily L Ballantyne et al. "Rate-activated strapping for improved retention of protective eyewear during impact", Cross Mark, International Sports Engineering Association, 2017. DOI: 10.1007/s12283-017-0226-1.

* cited by examiner

10

110

120b
122b
130
122a
120a

110

10

110

130

122a

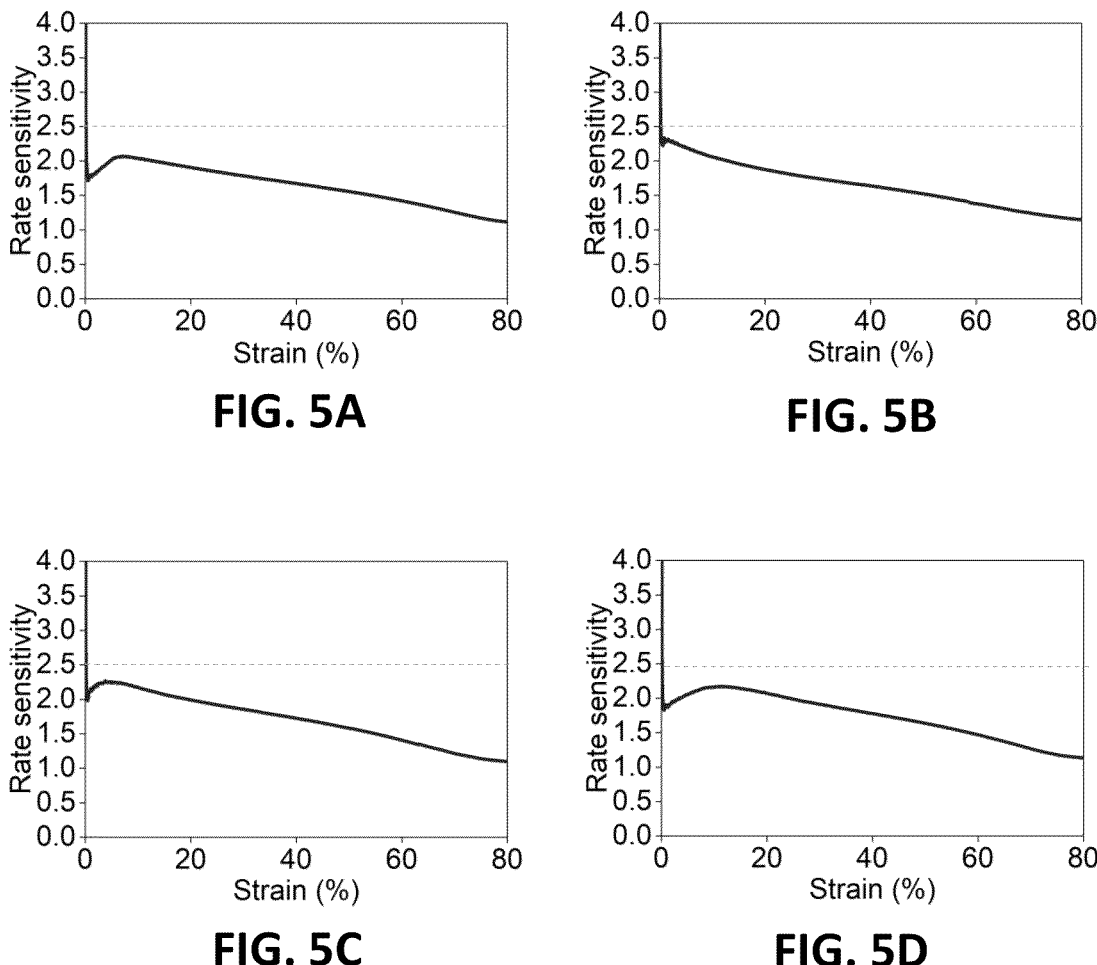
FIG. 5A
FIG. 5B
FIG. 5C
FIG. 5D
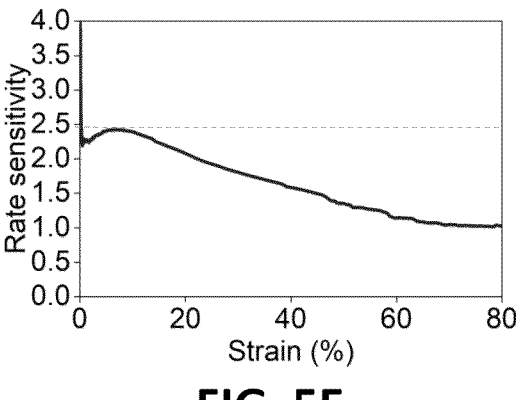
FIG. 5E

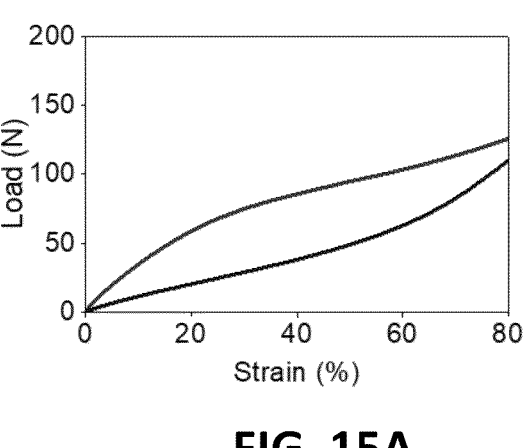
FIG. 15A
FIG. 15B
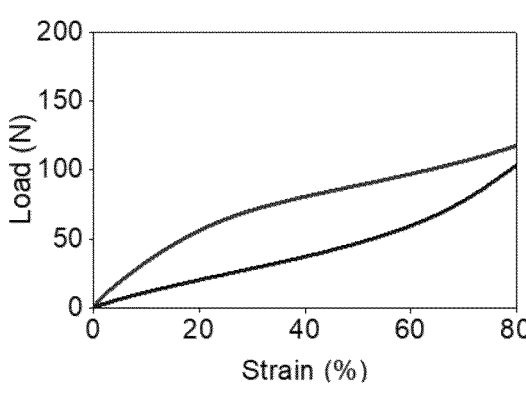
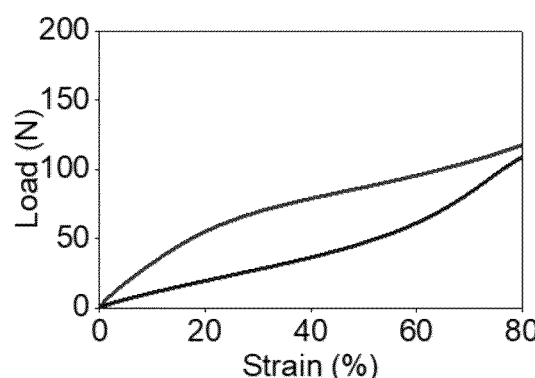
FIG. 15C
FIG. 15D
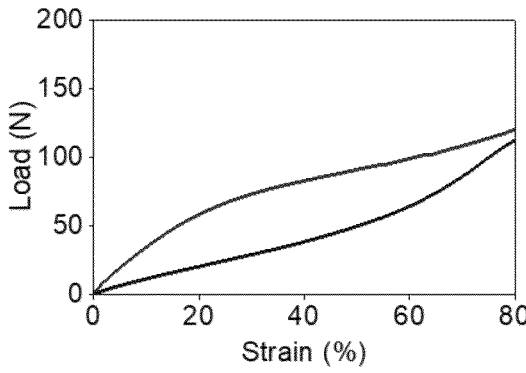
FIG. 15E

RATE-SENSITIVE PROTECTIVE APPAREL

CROSS-REFERENCE TO RELATED APPLICATION

The present application claims priority from U.S. provisional patent application Ser. No. 63/358,860 filed Jul. 6, 2022, and the disclosure of which is incorporated herein by reference in its entirety.

FIELD OF THE INVENTION

The invention relates to the technical field of protective apparels. In particular, it relates to rate-sensitive protective apparel having impregnated shear thickening fluid and fibers.

BACKGROUND OF THE INVENTION

Body injuries such as sprains and blunt impacts are common occurrences during activities such as heavy lifting and sports. Among the various body parts, the knees and ankles are particularly susceptible to such injuries. In fact, these two areas account for over 50% of common sports injuries, with knee injuries comprising 20% and ankle injuries comprising 34% of the total. To mitigate the risk of injuries to the knees and ankles, individuals often wrap bandages around them. While these bandages offer some level of support and act as a cushion during impacts, traditional non-elastic bandages restrict joint movement and provide limited protection against blunt impacts. On the other hand, elastic bandages offer greater flexibility, but they fail to prevent joint inversion and blunt force trauma. Therefore, there exists a need for protective apparel that offers both adequate support and a comfortable fit.

Therefore, the present invention addresses this need.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems of a protective apparel that provides adequate support and comfortable fit even in the case of blunt force trauma.

Accordingly, one aspect of the present invention provides a rate-sensitive protective apparel including an outer fabric shell, a first sealing material layers positioned within the outer fabric shell, a second sealing material layers positioned within the outer fabric shell, and a shear thickening fluid core disposed between the first and second sealing material layers. The sealing material layers have fibers extending towards the apparel interior and enmeshing the shear thickening fluid core. The shear thickening fluid core includes a shear thickening fluid, which directly contacts the sealing material and the fibers.

In a further embodiment of the present invention, the first and second sealing material layers are treated with a coupling agent, selected from 3-triethoxysilylpropyl isocyanate or 3-aminopropyltriethoxysilane.

In a further embodiment of the present invention, the first and second sealing material layers are treated with 2-hydroxyethyl acrylate.

In a further embodiment of the present invention, the outer fabric shell has a width greater than the first sealing material layer, the second sealing material layer, and the shear thickening fluid core.

In a further embodiment of the present invention, the fibers have a length ranging between 1 and 12 mm.

In a further embodiment of the present invention, the fibers are selected from natural fibers or artificial fibers.

In a further embodiment of the present invention, the fibers have a density ranging from 1 to 20 per $cm^2$ on both the first and second sealing material layers.

In a further embodiment of the present invention, the shear thickening fluid includes nanoparticles or nanowires suspended in a polyethylene glycol.

In a further embodiment of the present invention, a mass ratio of the nanoparticles or nanowires and the polyethylene glycol ranging from 1:1 to 2.5:1.

In a further embodiment of the present invention, the first and second sealing material layers are selected from silicone, latex, neoprene rubber, styrene-butadiene rubber, EPDM rubber, or a combination thereof.

In a further embodiment of the present invention, the outer fabric shell is composed of an elastic fabric capable of conforming to complex curvature.

Another aspect of the present invention involves a method for manufacturing a rate-sensitive protective apparel including providing a first outer fabric shell and coating a first sealing material onto the first outer fabric shell to form a first sealing material layer. Next, first fibers are flocked on the first sealing material layer. Subsequently, a second outer fabric shell is provided. The second outer fabric shell is coated with a second sealing material to form a second sealing material layer on it. Second fibers are flocked on the second sealing material layer. The edges of the first and second sealing material layers are glued together. A shear thickening fluid is injected or printed between the first and second sealing material layers to form a shear thickening fluid core.

In a further embodiment of the present invention, the method further includes treating the rate-sensitive protective apparel with a coupling agent selected from 3-triethoxysilylpropyl isocyanate or 3-aminopropyltriethoxysilane.

In a further embodiment of the present invention, the method further includes treating the rate-sensitive protective apparel with 2-hydroxyethyl acrylate.

In a further embodiment of the present invention, the outer fabric shell has a width greater than the first sealing material layer, the second sealing material layer, and the shear thickening fluid core.

In a further embodiment of the present invention, the first and second fibers have a length ranging from 1 to 12 mm.

In a further embodiment of the present invention, the first and second fibers have a density ranging from 1 to 20 per $cm^2$ on the first and second sealing material layers.

In a further embodiment of the present invention, the shear thickening fluid includes nanoparticles or nanowires suspended in polyethylene glycol.

In a further embodiment of the present invention, a mass ratio between the nanoparticles or nanowires and polyethylene glycol ranging from 1:1 to 2.5:1.

In a further embodiment of the present invention, the first and second sealing materials are selected from silicone, latex, neoprene rubber, styrene-butadiene rubber, EPDM rubber, or a combination thereof.

BRIEF DESCRIPTION OF THE DRAWINGS

In order to more clearly illustrate the technical solutions of the embodiments of the present invention, the drawings needed to be used in the description of the embodiments will be briefly introduced below. It is noted that the drawings in the following description are only some embodiments of the present invention, and it is obvious for those skilled in the art to obtain other drawings based on these drawings without inventive exercise, in which:

FIGS. 5A to 5E are rate sensitivity-strain graphs of rate-sensitive protective apparels according to some embodiments of the present invention, respectively;

FIG. 6A depicts a first outer shell; FIG. 6B depicts that a first sealing material covers a portion of the first outer shell; FIG. 6C shows that the first fibers are enmeshed in the first sealing material; FIG. 6D is a cross-sectional view of a second outer shell, a second sealing material and second fibers are then formed and glued together with the first outer shell, first sealing material and the first fibers; and FIG. 6E is a cross-sectional view of a final product of rate-sensitive protective apparel;

FIG. 8A relates to an oxygen plasma treatment; and FIG. 8B depicts a silane coupling agent treatment;

FIGS. 9A to 9D are representative diagrams showing chemical structures of coupling agents of a rate-sensitive protective apparel according to some embodiments of the present invention; FIG. 9A is the chemical structure of 3-glycidoxypropyltriethoxysilane; FIG. 9B depicts the chemical structure of N-(3-trimethoxysilylpropyl)ethylene-diamine; FIG. 9C demonstrates the chemical structure of 3-triethoxysilylpropyl isocyanate; and FIG. 9D exhibits the chemical structure of 3-aminopropyltriethoxysilane;

FIG. 12A depicts an oxygen plasma treatment; FIG. 12B shows a silane coupling agent treatment; and FIG. 12C shows a surface modification;

FIGS. 15A to 15E are stress-strain graphs of rate-sensitive protective apparels according to some embodiments of the present invention, respectively;

FIG. 18A shows a pattern of parallel long and short lines; FIG. 18B is a pattern with dense dashes in an array; FIG. 18C depicts a pattern being parallel straight lines spanning across the surface; and FIG. 18D depicts a pattern of densely packed dots in an array.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

As used herein, the term "fiber" refers to natural fibers or artificial fibers, including, but not limited to, plant fibers, animal fibers, mineral fibers, regenerated fiber, synthetic fiber, and inorganic fibers.

Figure 1A:
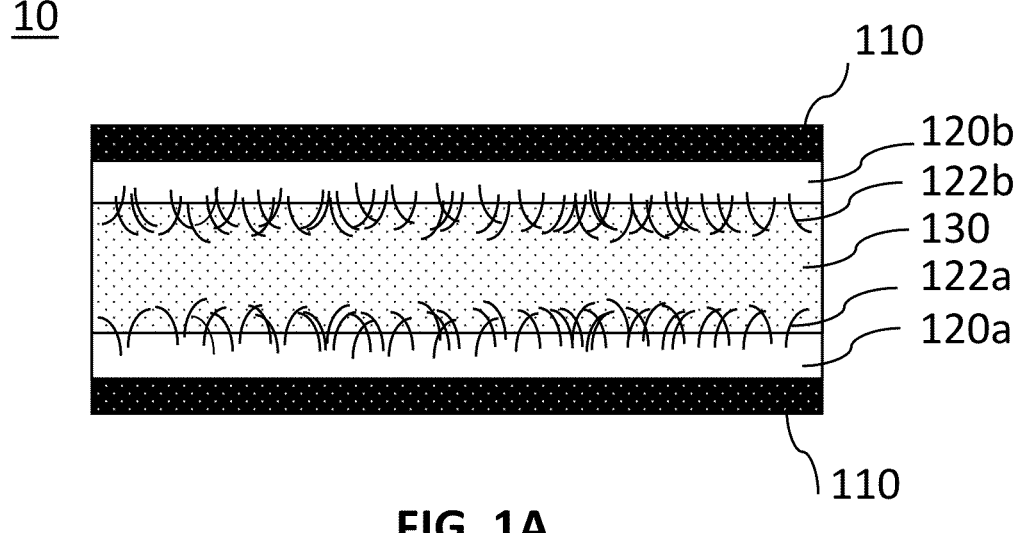
FIG. 1A is a cross-sectional, schematic diagram showing an overall construction of a rate-sensitive protective apparel according to an embodiment of the present invention.

Referring to FIG. 1A, a cross-sectional view along a thickness of a rate-sensitive protective apparel 10 according to an embodiment of the present invention is shown. In this embodiment, the rate-sensitive protective apparel 10 is a strip in a rectangular configuration. The rate-sensitive protective apparel 10 includes an outer fabric shell 110, a first sealing material layer 120a, a second sealing material layer 120b, and a shear thickening fluid core 130. The first and second sealing material layers 120a and 120b are positioned within the outer fabric shell 110 and opposed each other. The shear thickening fluid core 130 is disposed between the first and second sealing material layers 120a and 120b. The shear thickening fluid core 130 is sandwiched between the first and second sealing material layers 120a and 120b, and the outer fabric shell envelops the shear thickening fluid core 130 and the first and second sealing layers 120a and 120b. The outer fabric shell 110 has a greater width compared to the first and second sealing material layers 120a and 120b, as well as the shear thickening fluid core 130.

The fibers 122a and 122b enmesh the first and second sealing material layers 120a and 120b, extending toward the interior of the apparel. These fibers 122a and 122b originate from and are integrated with the respective first and second sealing material layers 120a and 120b, and they merge with the shear thickening fluid core 130 containing shear thickening fluid. In FIG. 1A, the fibers 122a on the first sealing material layer 120a do not overlap with the fibers 122b on the second sealing material layer 120b. However, in certain embodiments, the length of the fibers 122a and 122b allows them to overlap with each other. The fibers 122a and 122b have a length ranging between 1 and 12 mm. In one embodiment, the fibers have a length ranging between 8 and 12 mm. The density of fibers 122a on the first sealing material layer 120a ranges between 1 and 20 per cm². In some embodiments, the fibers 122b on the second sealing material layer 120b have the same density as the fibers 122a. However, in other embodiments, the fibers 122b may have a different density from the fiber 122a. This variation can also apply to the length of the fibers 122a and 122b. More specifically, in an embodiment, the length of fibers 122a and 122b is substantially identical. In another embodiment, the lengths of fibers 122a and 122b differ. Electrostatic flocking is used to deposit the fibers 122a and 122b onto the sealing materials 120a and 120b. The fibers may be made from materials such as polyamide, rayon, cotton or polyester.

Figure 1B:
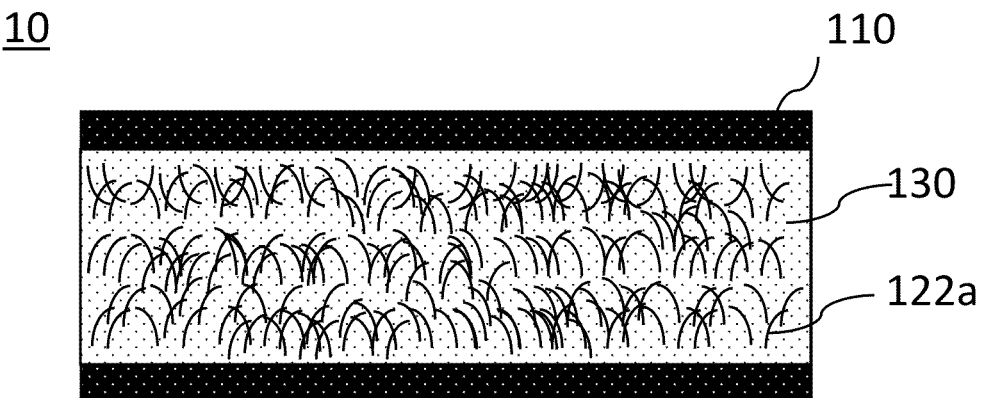
FIG. 1B is another cross-sectional, schematic diagram showing a rate-sensitive protective apparel according to an embodiment of the present invention.

Referring to FIG. 1B, a different cross-sectional view of the rate-sensitive protective apparel 10 is presented. This cross-section passes through the shear thickening fluid core 130 of the rate-sensitive protective apparel 10. Due to the overlap of the shear thickening fluid core 130, the first sealing material layer 120a is not visible in FIG. 1B. However, the fibers 122a, which are rooted in the first sealing material layer 120a, can be observed in this cross-section as they extend into the shear thickening fluid core 130.

In one embodiment, the shear thickening fluid core includes nanoparticles or nanowires and polyethylene glycol. The nanoparticles or nanowires are suspended in the polyethylene glycol. In one embodiment, the nanoparticles are silicon dioxide and the solvent is polyethylene glycol. A mass ratio between the nanoparticles or nanowires and polyethylene glycol ranges between 1:1 and 2.5:1. In one embodiment, the mass ratio between the nanoparticles or nanowires and polyethylene glycol is 2.3 to 1. When the shear rate increases above a critical value, the viscosity of the shear thickening fluid core increases. The increased viscosity is a result of the sudden clustering of nanoparticles or nanowires.

When the rate-sensitive protective apparel is stretched, the internal friction between fibers and shear thickening fluid demonstrates rate sensitive due to the shear thickening effect of the shear thickening fluid core. Additionally, the length of the fibers influences the rate sensitivity of the internal friction. Once the internal friction between the fibers and shear thickening fluid exceeds a certain threshold, further stretching of the protective apparel becomes impossible due to excessively high internal friction. Therefore, an evaluation is conducted to assess the impact of fiber length on rate sensitivity.

Figure 2A:
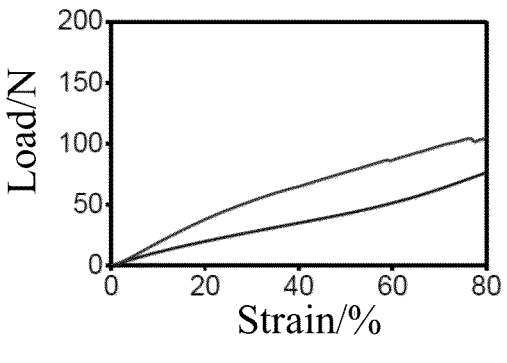
FIGS. 2A and 2B are stress-strain and rate sensitivity-strain graphs respectively of a rate-sensitive protective apparel according to an embodiment of the present invention.
Figure 2B:
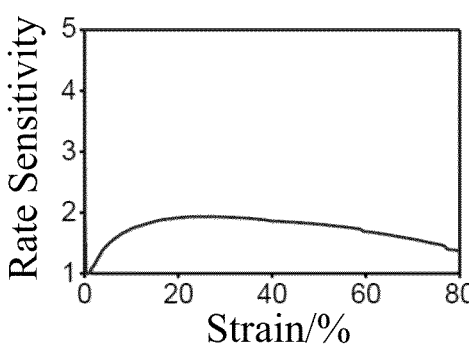

Referring to FIGS. 2A, 2B, 3A, and 3B, the stress-strain property of the rate-sensitive protective apparels of fibers with different length are illustrated. In FIGS. 2A and 2B, the rate-sensitive protective apparel has shorter fibers compared to those used in FIGS. 3A and 3B. Specifically, in FIG. 2A, fibers measuring 12.5 mm in length are stretched at rates of 50 mm/min and 500 mm/min. The upper curve represents the result of the 500 mm/min stretch, while the lower curve corresponds to the 50 mm/min stretch. Rate sensitivity is calculated by dividing the load (N) under 500 mm/min by the load (N) under 50 mm/min. The results are plotted in FIG. 2B. It should be noted that the following rate sensitivity of different samples is calculated by the same method outlined above.

Figure 3A:
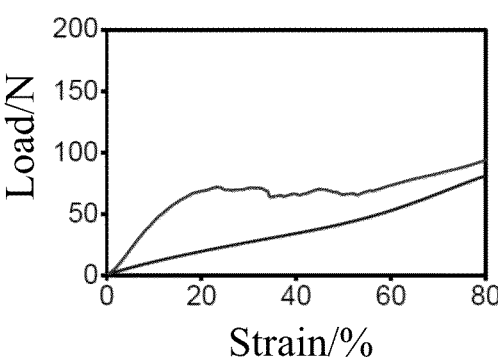
FIGS. 3A and 3B are stress-strain and rate sensitivity-strain graphs respectively of a rate-sensitive protective apparel according to an embodiment of the present invention.
Figure 3B:
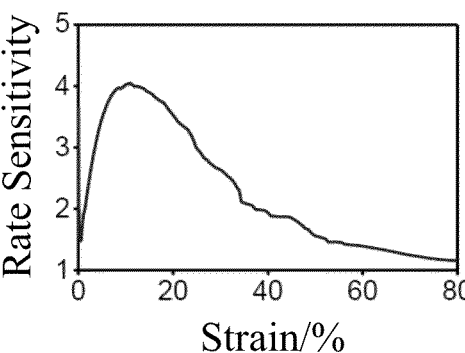

In FIG. 3A, the fibers measuring 25 mm in length are subjected to 50 mm/min and 500 mm/min stretches. Similarly, the upper curve represents the results of the 500 mm/min stretch, while the lower curve displays the 50 mm/min stretch. The corresponding rate sensitivity results are plotted in FIG. 3B. It can be observed that longer fibers exhibit higher rate sensitivity. In other words, when the rate-sensitive protective apparel incorporates longer fibers, the internal friction between the fiber and shear thickening fluid core becomes more responsive to the stretching rate.

Referring to FIGS. 4A to 4E, the rate-sensitive protective apparels having fibers of different lengths are tested for their stress-strain property. The lengths of the fibers in FIGS. 4A to 4E are 3, 5, 8, 10, and 12 mm, respectively. All fibers undergo O₂ plasma treatment and are tested at stretching rates of 50 mm/min and 500 mm/min.

Figures 4A, 4B, 4C, 4D, 4E:
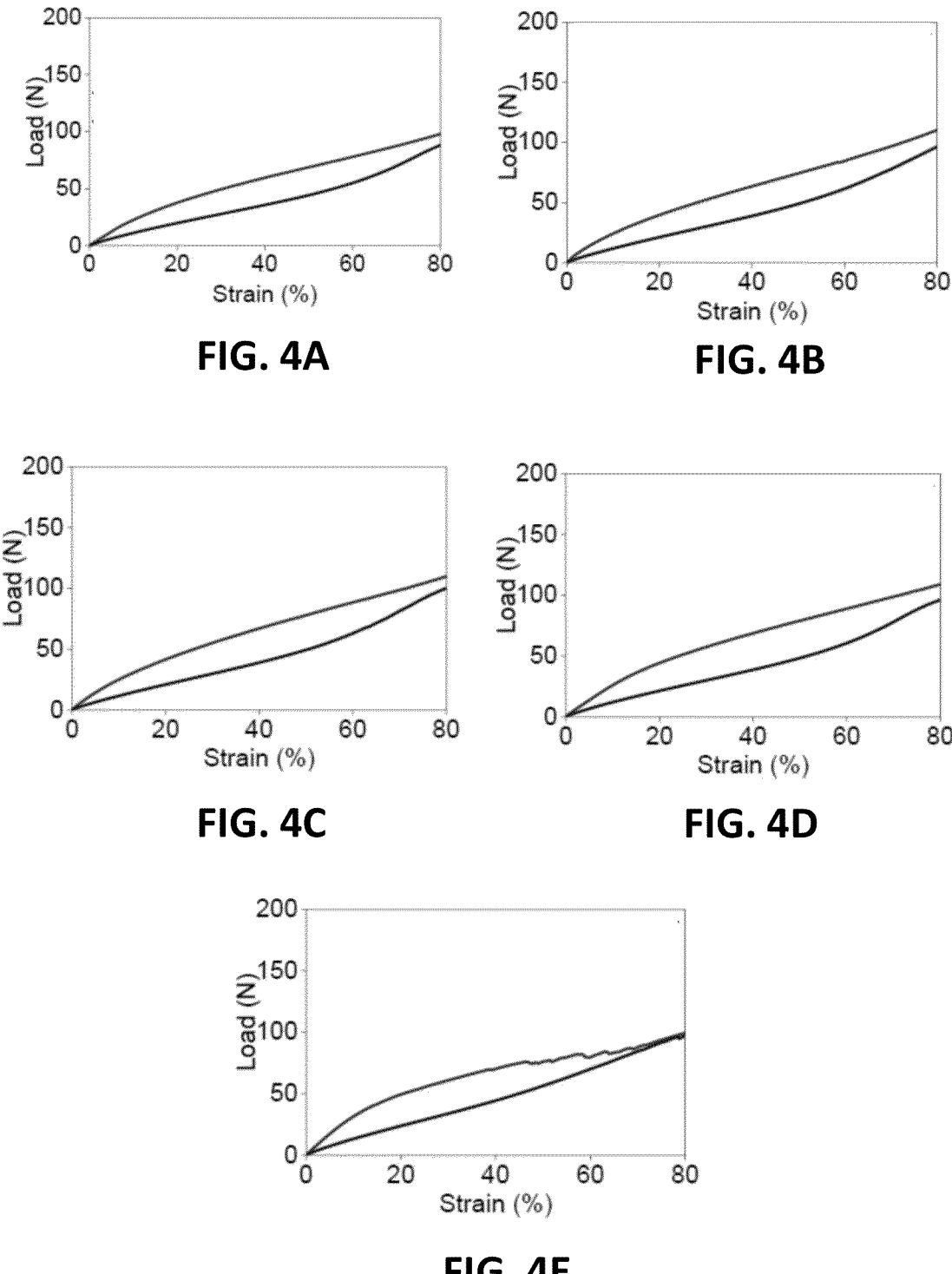
FIGS. 4A to 4E are stress-strain graphs of rate-sensitive protective apparels according to some embodiments of the present invention, respectively.

In FIG. 4A, the rate-sensitive protective apparel incorporates fibers measuring 3 mm in length. The upper curve represents the results of the 500 mm/min stretch, while the lower curve corresponds to the 50 mm/min stretch. This pattern is consistent across FIGS. 4B to 4E, each representing different fiber lengths. For example, in FIG. 4E, the rate-sensitive protective apparel employs fibers measuring 12 mm in length. The upper curve in FIG. 4E displays the results of the 500 mm/min stretch, while the lower curve illustrates the 50 mm/min stretch.

Referring to FIGS. 5A to 5E, the rate sensitivity of the five rate-sensitive protective apparels is calculated and plotted respectively. A rate sensitivity benchmark of 2.5 is indicated by a dashed line in the graphs. As observed, an increase in fiber within the rate-sensitive protective apparel leads to a more prominent peak in rate sensitivity under less intense strain.

In FIG. 5A, where the fibers measuring 3 mm in length, the peak rate sensitivity occurs at approximately 2. Moving on to FIGS. 5C and 5D, with fibers measuring 8 mm and 10 mm, respectively, the rate-sensitive protective apparels exhibit a higher number in a range between 2.0 and 2.5. In FIG. 5E, with measuring 12 mm, the peak rate sensitivity is around 2.5. It is worth noting that the fiber length may be exceed 12 mm, such as 15 mm, 20 mm, 25 mm, or even longer. The range for fiber length spans from 0.5 mm and 50 mm.

Figure 6A:
FIGS. 6A to 6E are schematic diagrams showing a method of manufacturing a rate-sensitive protective apparel according to an embodiment of the present invention.

The method 1000 of manufacturing a rate-sensitive protective apparel is explained as depicted in FIGS. 6A to 6E. In FIG. 6A, a first outer shell 612 is provided. In one embodiment, the first outer shell 612 is crafted from an elastic fabric and shaped according to a desired shape. Next, in FIG. 6B, a first sealing material 614 is introduced, covering a portion of the first outer shell 612. It is important note that the first sealing material 614 has smaller dimensions than the first outer shell 612. Various materials can be used for the first sealing material 614, including silicone, latex, neoprene rubber, styrene-butadiene rubber, and EPDM rubber. Finally, in the subsequent step illustrated in FIG. 6C, fibers 616 are enmeshed within the first sealing material 614 through the process of electrostatic flocking.

As used herein, the term "electrostatic flocking" is a textile engineering technique, which use Coulombic driving forces to propel microfibers towards a substrate, leaving a forest of aligned fibers. The surface may optionally include an adhesive or be made tacky in order to engage the fibers.

Figure 6B:
Figure 6C:
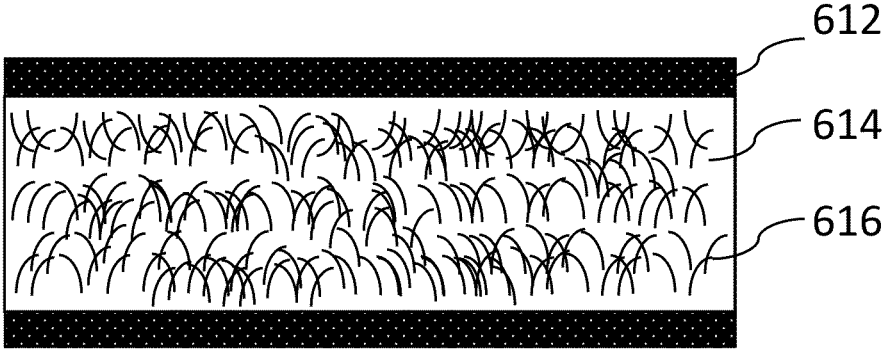

Following the electrostatically flocking of fibers 616 onto the first sealing material 614, substantially identical process, as described in FIGS. 6A to 6C, is employed to fabricate the other half of the rate-sensitive protective apparel. Moving on to FIG. 6D, a cross-sectional view of a partially finished rate-sensitive protective apparel is presented. A second outer shell 622, second sealing material 624 and fibers 626 are subsequently formed and securely bonded to the first outer shell 612, first sealing material 614 and fibers 616. The adhesion between these layers is ensured using an adhesive, such as, silicone adhesive sealants.

Figures 6D, 6E:
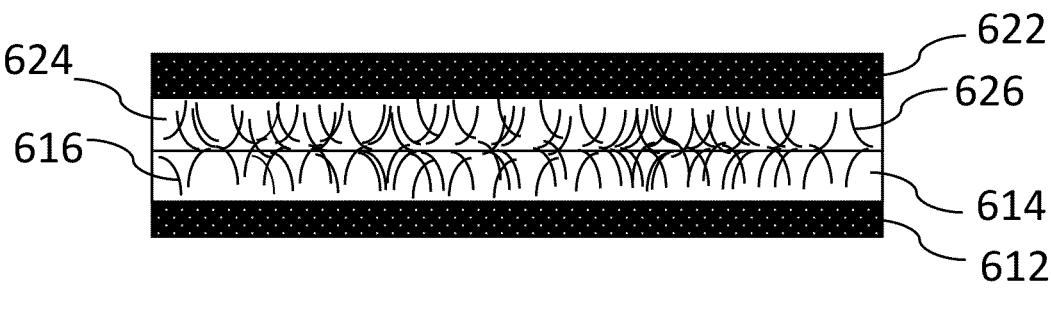

Referring to FIG. 6E, a shear thickening fluid core 618 is formed between the first and second sealing materials 614 and 624. The shear thickening fluid core 618 is introduced by injection or printing, filling the space between the first and second sealing materials 614 and 624. The fibers 616 and 626 extend beyond the thickness of the first and second sealing materials 614 and 624 and penetrate into the shear thickening fluid core 618. This means that a portion of the fibers 616 and 626 is entangled within the first and second sealing materials 614 and 624, while the remaining portion of the fibers 616 and 626 is immersed within the shear thickening fluid core 618.

Figure 7:
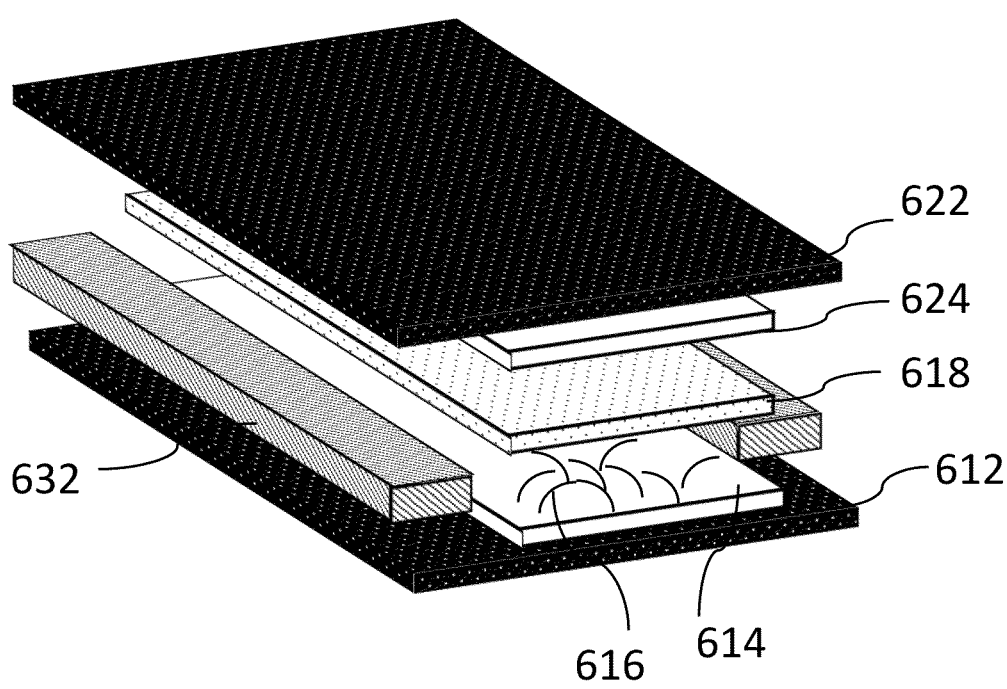
FIG. 7 is a perspective view of a rate-sensitive protective apparel according to an embodiment of the present invention.

Referring to FIG. 7, a perspective view of a rate-sensitive protective apparel 12 in accordance with an embodiment of the present invention is presented. The rate-sensitive protective apparel 12 includes outer shells 612 and 622, first and second sealing materials 614 and 624, fibers 616 and 626 (not shown) interwoven with the first and second sealing material 614 and 624, a shear thickening fluid core 618, and the glue 632. The shear thickening fluid core 618 is positioned between the first and second sealing materials 614 and 624. It is worth noting that the fibers 616 depicted in FIG. 7 represent a portion of their overall distribution. As shown in FIG. 6D, the surfaces of the first and the second sealing materials 614 and 624 are enmeshed with the fibers 616 and 626. The glue 632 is applied to the raw edges of the first and second outer shells 612 and 622, encasing the first and second sealing materials 614 and 624.

Figure 8A:
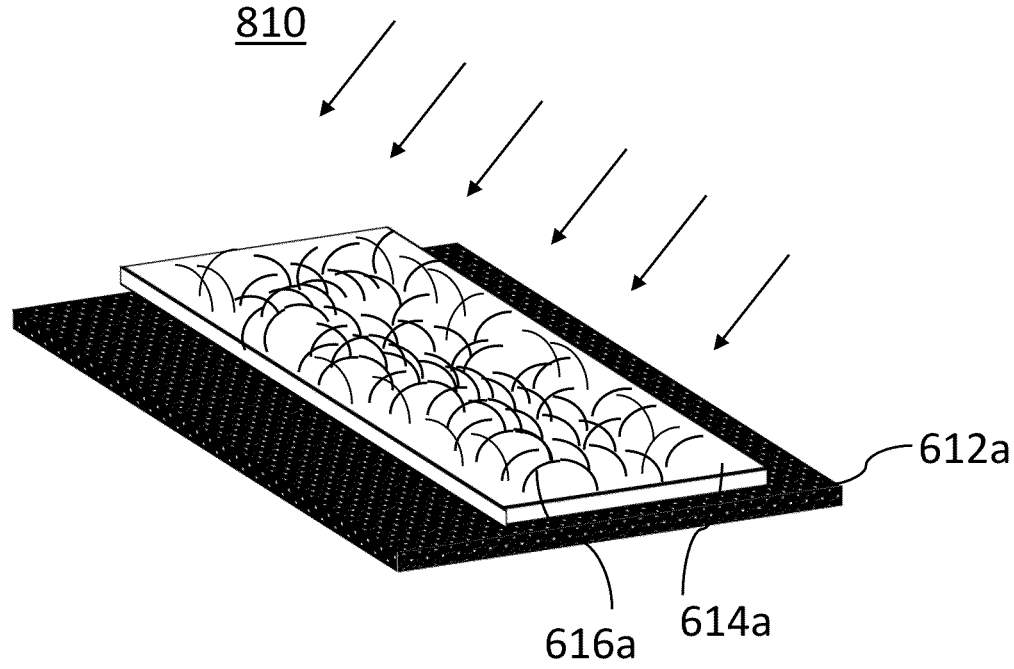
FIGS. 8A and 8B are schematic diagrams showing a method of treating a rate-sensitive protective apparel according to an embodiment of the present invention.
Figure 8B:
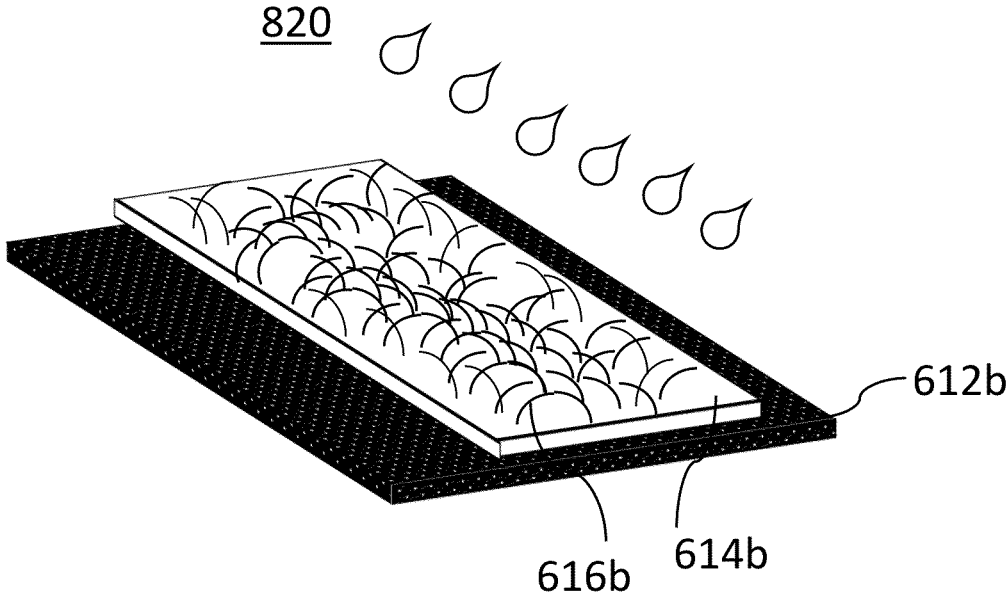

In some embodiments, additional treatment is applied to the sealing materials and fibers before the formation of the rate-sensitive protective apparel. Referring to FIG. 8A, in one embodiment, the sealing materials and fibers undergo oxygen plasma treatment 810 at 200 W for 10 minutes. It is important to note that the oxygen plasma treatment is applied to the half-product including the outer shell 612a, the first sealing material 614a, and the fibers 616a. The oxygen plasma treatment 810 induces the formation of polar functional groups on the surface of the first sealing material 614a. For instance, if the sealing material is silicone rubber, the resulting functional group is primarily the silanol group (SiOH). This silanol group changes the surface properties of the sealing material from hydrophobic to hydrophilic. Next, as shown in FIG. 8B, the plasma treated outer shell 612b, first sealing material 614b, fibers 616b are immersed in a silane coupling agent 820. This treatment with the silane coupling agent enhances the bonding between the first sealing material 614b and the shear thickening fluid core 618, as well as the bonding between the fibers 616b and the shear thickening fluid core 618 when the thickening fluid core 618 is applied.

Figures 9A, 9B:
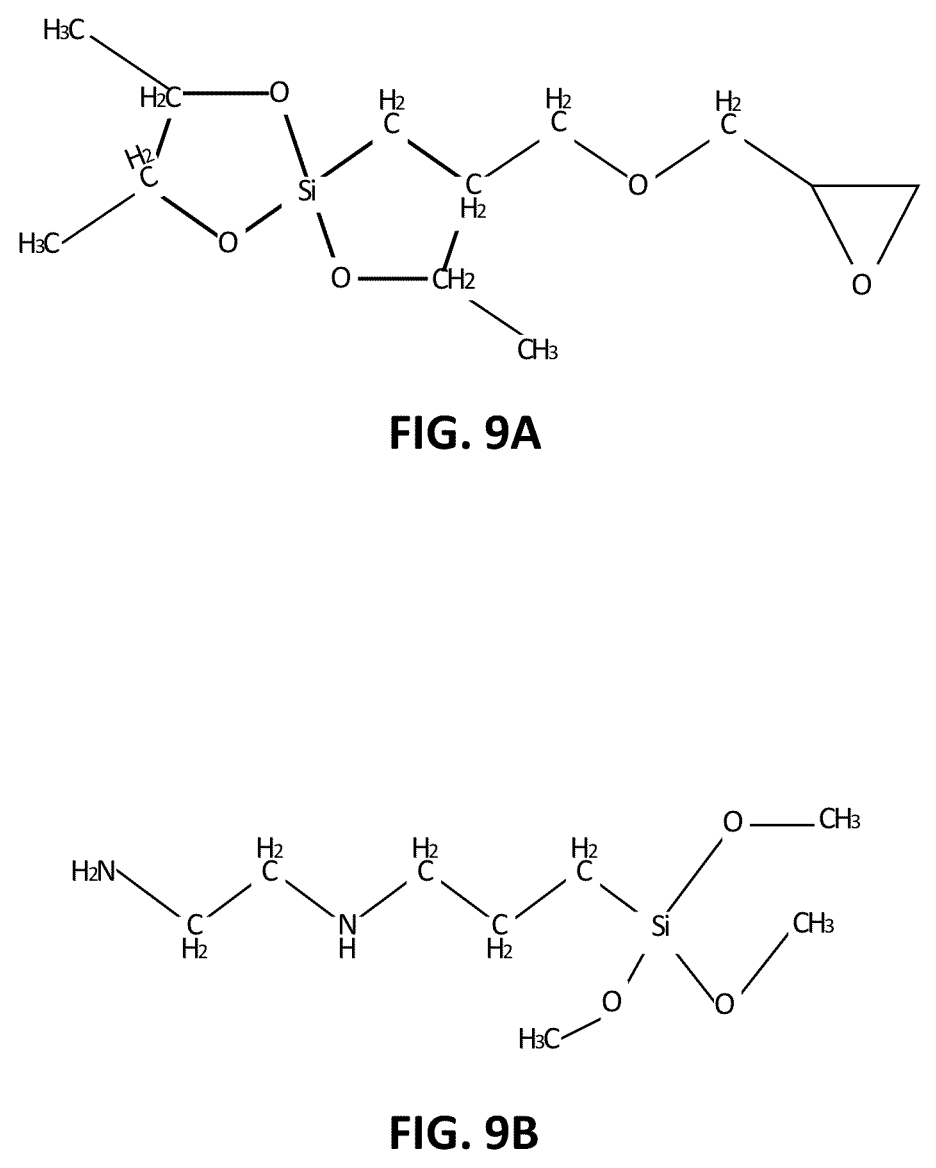
Figures 9C, 9D:
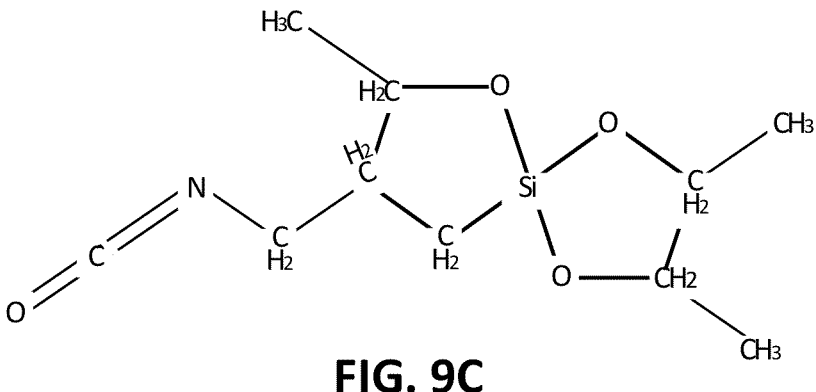

Turning to FIGS. 9A to 9D, four different silane coupling agents are used respectively for the treatment. These silane coupling agents are 3-glycidoxypropyltriethoxysilane, as shown in FIG. 9A, N-(3-trimethoxysilylpropyl)ethylenediamine, as shown in FIG. 9B, 3-triethoxysilylpropyl isocyanate, as shown in FIG. 9C, and 3-aminopropyltriethoxysilane, as shown in FIG. 9D. In an embodiment, 1 wt % of the silane coupling agents is dissolved in 95% ethanol for 2 hours. Subsequently, the first sealing materials, fibers and outer shell are dried at 120° C. for 1 hour. In one embodiment, a second oxygen plasma treatment is performed after the treatment of silane coupling agent. The second oxygen plasma treatment enhances the hydrophilic property on the surface of the sealing material.

Figures 10A, 10B, 10C, 10D:
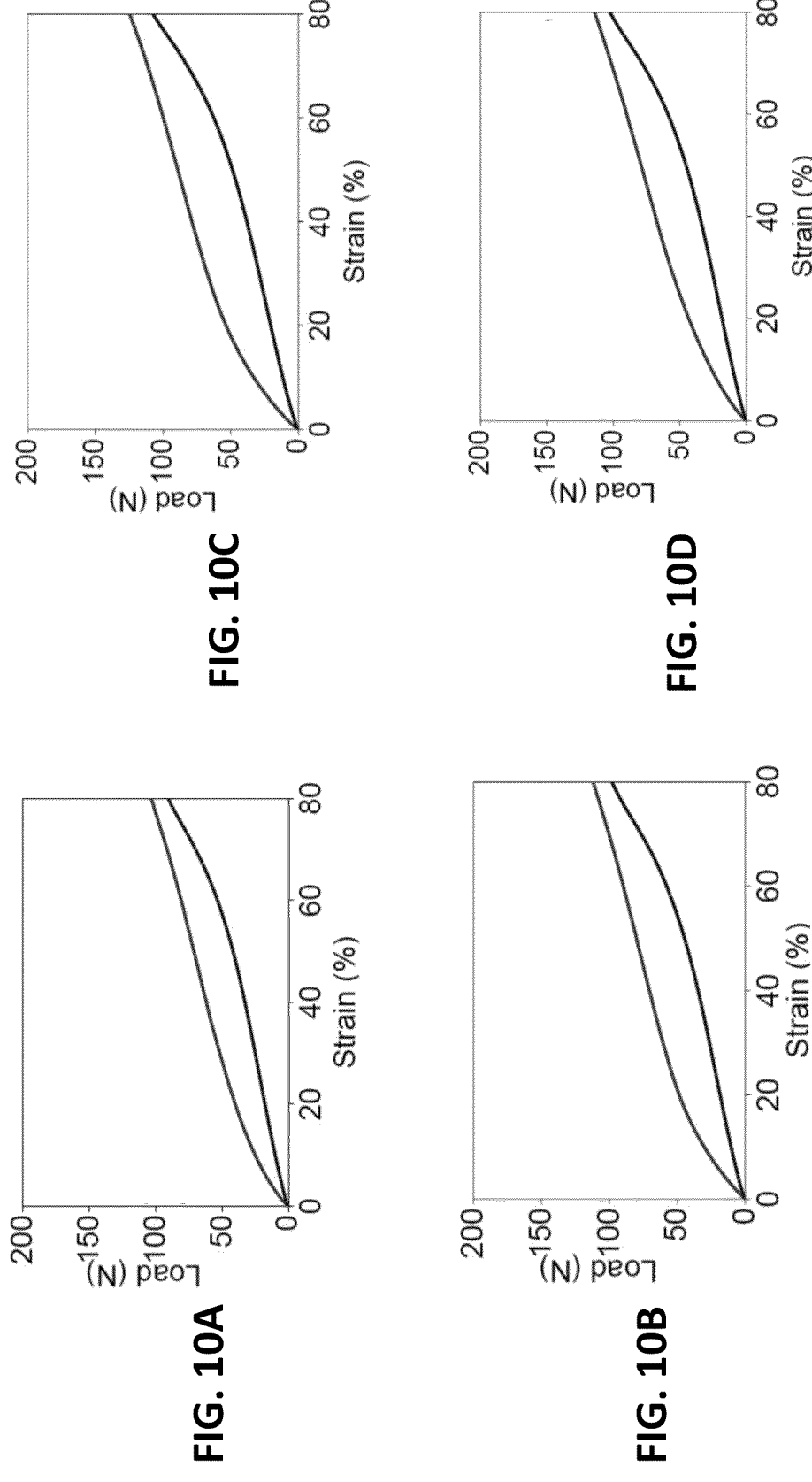
FIGS. 10A to 10D are stress-strain graphs of rate-sensitive protective apparels according to some embodiments of the present invention, respectively.

Referring to FIGS. 10A to 10D, the treated rate-sensitive protective apparels, possessing 12-mm fibers, treated with 3-glycidoxypropyltriethoxysilane, N-(3-trimethoxysilylpropyl)ethylenediamine, 3-triethoxysilylpropyl isocyanate, and 3-aminopropyltriethoxysilane, respectively, are tested for their stress-strain properties under 50 mm/min and 500 mm/min conditions. In FIG. 10A, the results from the 3-glycidoxypropyltriethoxysilane treated rate-sensitive protective apparel are displayed. The upper curve represents the outcome of the 500 mm/min stretching test, while the lower curve depicts the results of the 50 mm/min stretching test. Similarly, in FIG. 10B, it is observed that the results from the N-(3-trimethoxysilylpropyl)ethylenediamine treated rate-sensitive protective apparel, with the upper curve representing the result from the 500 mm/min stretching test and the lower curve indicating the 50 mm/min stretching test. Referring to FIG. 10C, the results from the 3-triethoxysilylpropyl isocyanate treated rate-sensitive protective apparel are presented, where the upper curve corresponds to the result from the 500 mm/min stretching test, and the lower curve refers to the result from the 50 mm/min stretching test. Finally, FIG. 10D illustrates the results from the 3-aminopropyltriethoxysilane treated rate-sensitive protective apparel with the upper curve indicating the results from the 500 mm/min stretching test and the lower curve representing the result from the 50 mm/min stretching test.

Figures 11A, 11B, 11C, 11D:
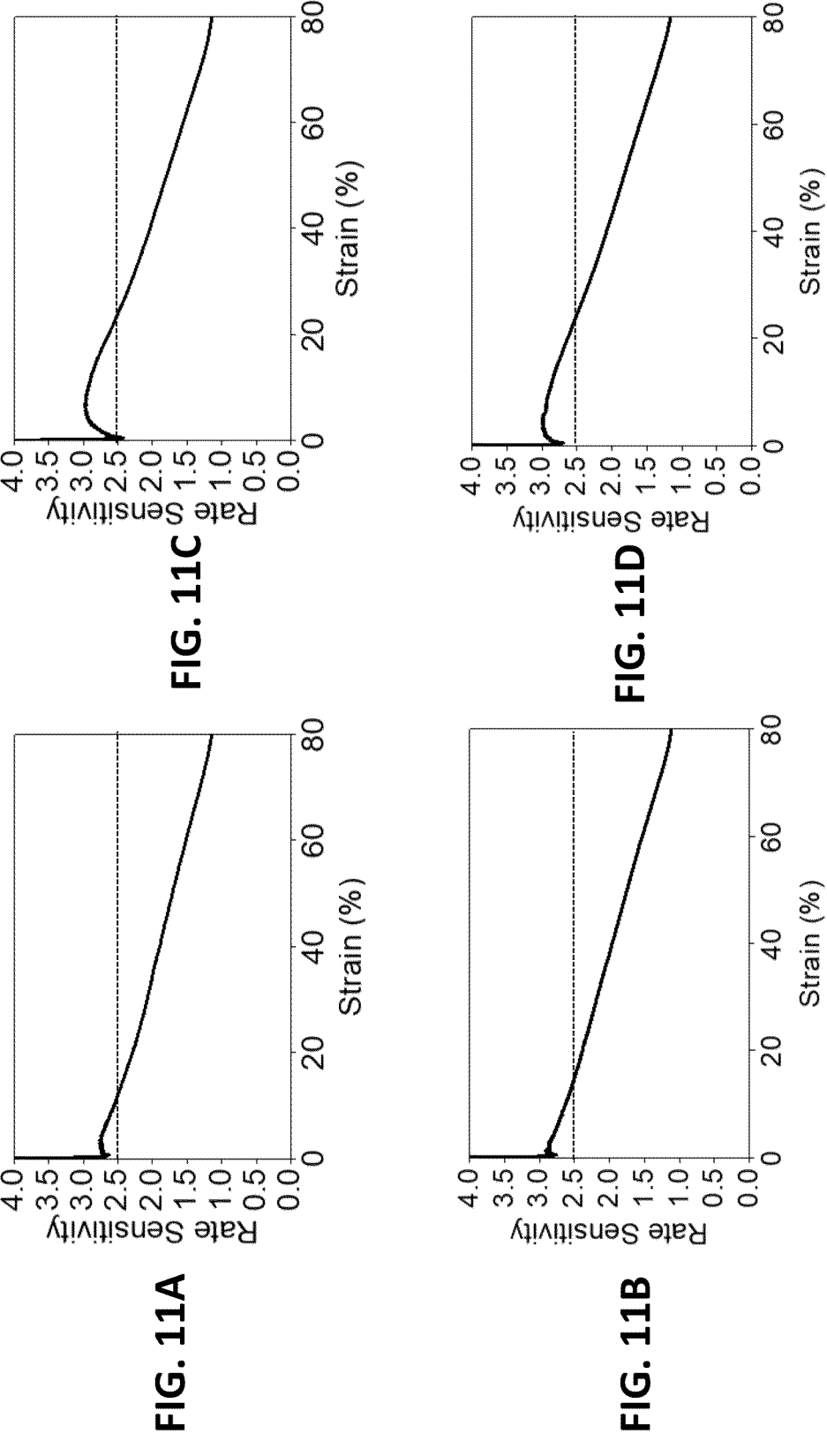
FIGS. 11A to 11D are rate sensitivity graphs of rate-sensitive protective apparels according to some embodiments of the present invention, respectively.

Referring to FIGS. 11A to 11D, the rate sensitivity of each of the four treated rate-sensitive protective apparels mentioned above is demonstrated. In each graph, a benchmark value of 2.5 is represented by a broken line. It is observed that the treatment with silane coupling agents enhances the rate sensitivity. Specifically, when a rate-sensitive protective apparel with 12-mm fibers is untreated with the silane coupling agent, the rate sensitivity peaks at approximately 2.5, as shown in FIG. 5E. However, the treatment with silane coupling agents elevates the rate sensitivity over the 2.5 benchmark. Notably, the treatment with 3-triethoxysilylpropyl isocyanate, as shown in FIG. 11C, and with 3-aminopropyltriethoxysilane, as shown in FIG. 11D, both exhibit a rate sensitivity reaching 3.0.

Figure 12A:
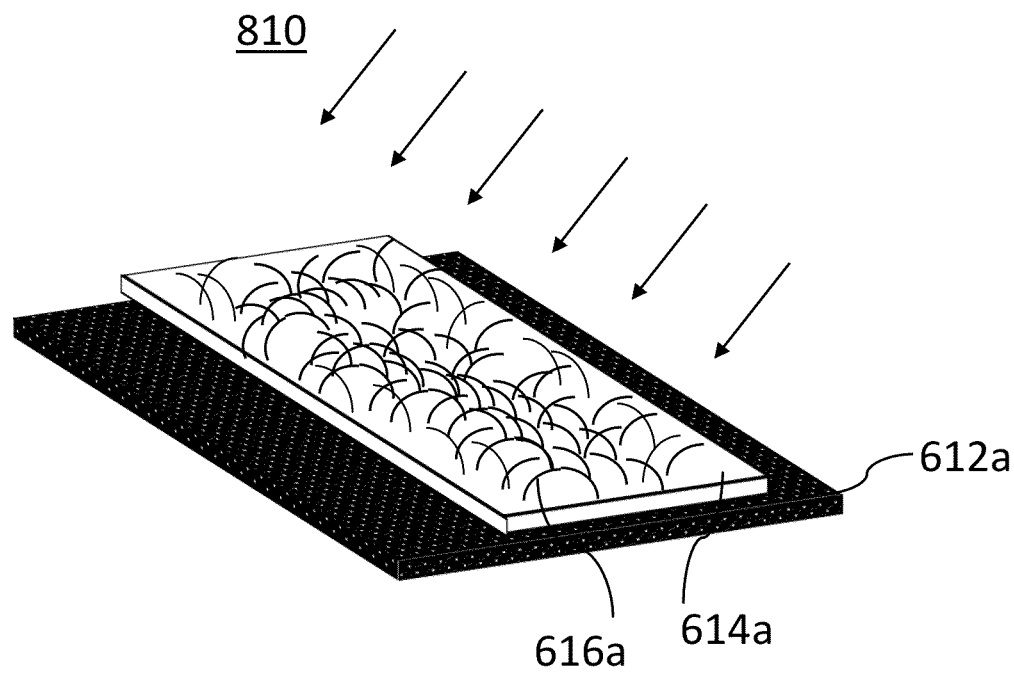
FIGS. 12A to 12C are schematic diagrams showing a method of modifying the surface of a rate-sensitive protective apparel according to an embodiment of the present invention.
Figure 12B:
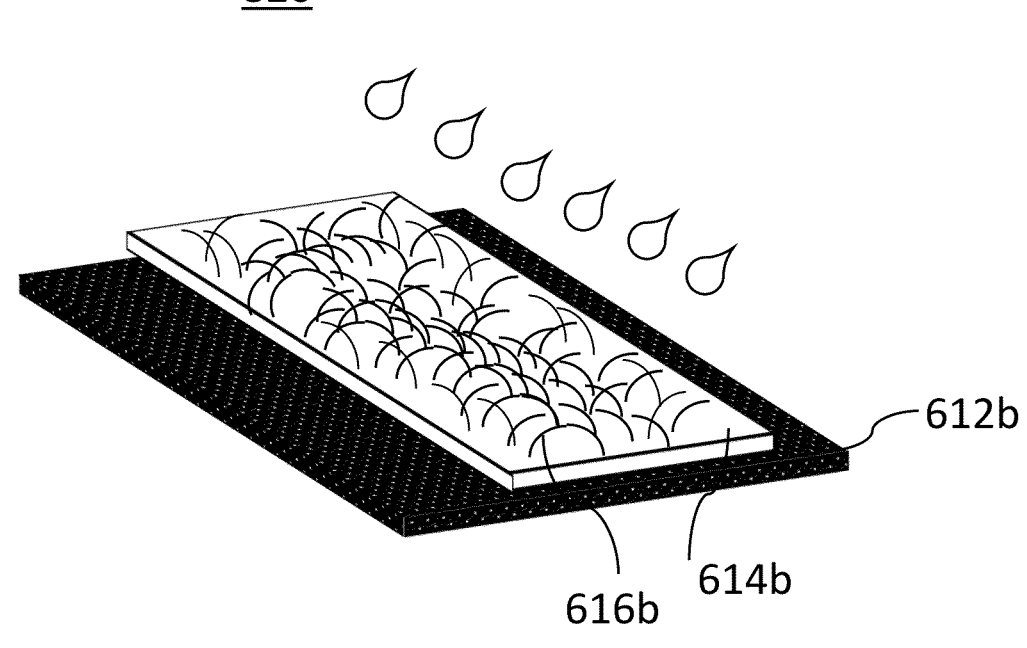
Figure 12C:
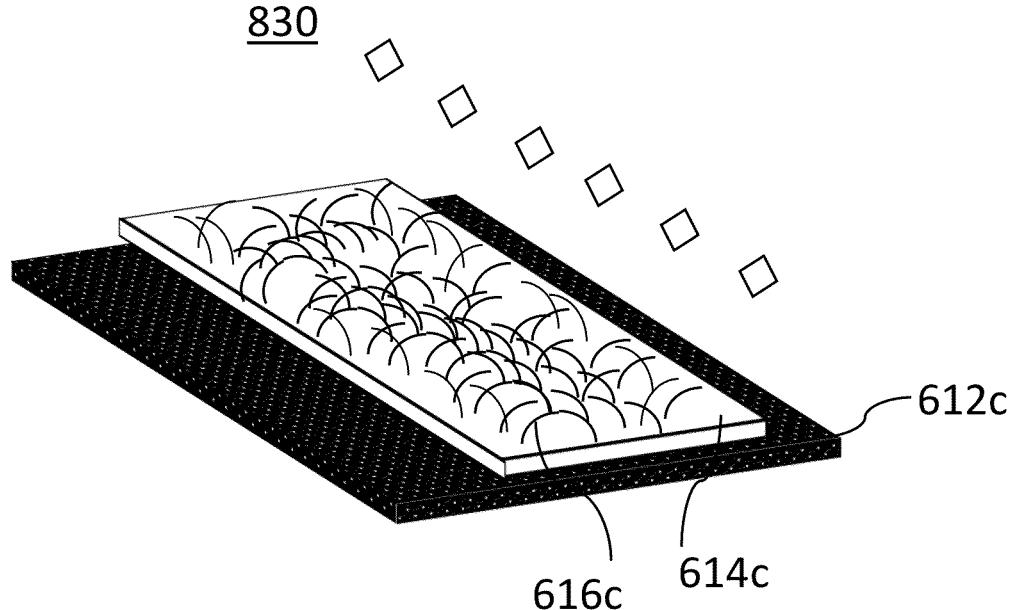

In one embodiment of the present invention, the sealing material and fibers undergo surface modification after the treatment with the silane coupling agent. Referring to FIGS. 12A to 12C, the outer shell 612a, sealing material 614a, and fibers 616a are subjected to oxygen plasma treatment 810, as depicted in FIG. 12A. In one embodiment, the oxygen plasma treatment is performed at 200 W for 10 minutes. Following that, as shown in FIG. 12B, the outer shell 612b, sealing material 614b, and fibers 616b are treated with a silane coupling agent 820. In one embodiment, the outer shell 612b, sealing material 614b, and fibers 616b are immersed in a silane coupling agent solution consisting of 1 wt % of silane coupling agent in 95% ethanol for 2 hours, and then dried at 120° C. for 1 hour. Subsequently, as shown in FIG. 12C, the outer shell 612c, sealing material 614c, and fibers 616c undergo surface modification 830 through blading or dipping in a modification solution. This surface modification process alters the surface properties of the sealing material layer from hydrophobic to hydrophilic. More specifically, the initial oxygen plasma treatment significantly changes the surface of the sealing material from hydrophobic to hydrophilic. The subsequent surface modification extends this hydrophilic property to the remaining hydrophobic areas by introducing hydrophilic functional group, such as a hydroxyl group, to the surface of the sealing material. This modification results in a stronger interfacial force between the shear thickening fluid, the sealing material, and the fibers when they are combined.

Figure 13:
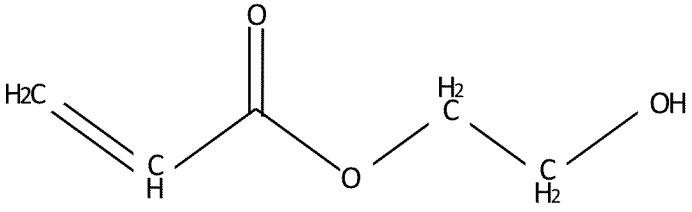
FIG. 13 is a representative diagram showing a chemical structure of an organic compound used in modifying the surface of a rate-sensitive protective apparel according to an embodiment of the present invention.

In an embodiment, the modification solution includes 2-hydroxythyl acrylate. Referring to FIG. 13, a representative chemical structure of 2-hydroxyehtyl acrylate is shown. In this embodiment, the hydroxyl groups (—OH group) from 2-hydroxyehtyl acrylate are transferred to the surface of the sealing material. The introduction of the —OH group increases the hydrophilic affinity of the sealing material and fibers.

Figure 14A:
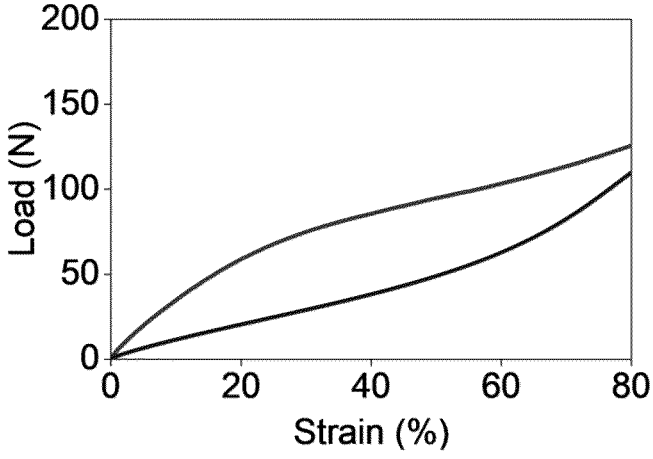
FIGS. 14A to 14B are stress-strain and rate sensitivity-strain graphs of a rate-sensitive protective apparel according to an embodiment of the present invention.
Figure 14B:
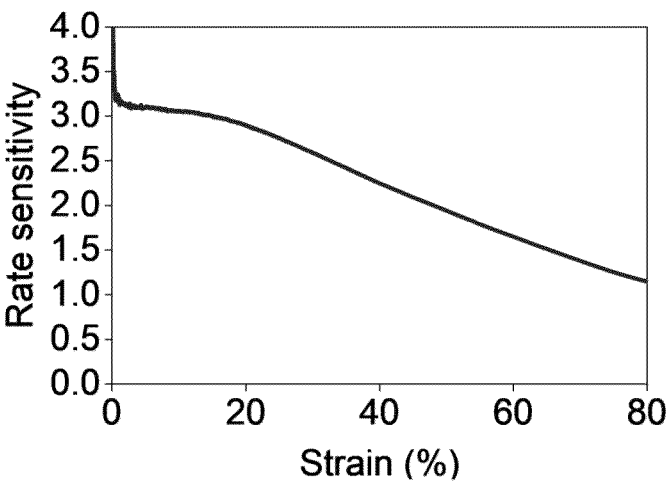

Referring to FIG. 14A, the rate-sensitive protective apparel with 12-mm fibers, undergoing oxygen plasma treatment, silane coupling agent treatment (3-aminopropyltriethoxysilane), and surface modification (2-hydroxyehtyl acrylate, blading at 120° C.), is tested under 50 mm/min and 500 mm/min stretching conditions. The upper curve in FIG. 14A represents the result of the 500 mm/min stretching test, while the lower curve in FIG. 14A represents the results from the 50 mm/min stretching test. To further evaluate the performance, the rate sensitivity of this rate-sensitive protective apparel is calculated and plotted in FIG. 14B. It is evident that the rate sensitivity exceeds 3.0 after undergoing these treatments. Referring back to FIGS. 10D and 11D, the rate-sensitive protective apparel in that sample undergoes the same treatment process, except it does not undergo the surface modification. Consequently, the rate sensitivity of this rate-sensitive protective apparel does not reach 3.0, as indicated in the figures. These results highlight the significance of surface modification in enhancing the rate sensitivity of the protective apparel.

Table 1 shows various formulations of the shear thickening fluid core. In the table, "PEG200" indicates polyethylene glycol 200, "PPG2000" represents polypropylene glycol 2000, and "MWCNT" indicates multi-walled carbon nanotubes. The measurement of the components are provided in gram.

TABLE 1

| Sample | SiO$_2$ | PEG200 | PPG2000 | MWCNT |
|---|---|---|---|---|
| S1 | 230 | 100 | 0 | 0 |
| S2 | 230 | 100 | 0 | 0.66 |
| S3 | 230 | 100 | 0 | 1.65 |
| S4 | 230 | 0 | 190 | 0 |
| S5 | 230 | 0 | 190 | 0.84 |

Figure 16A:
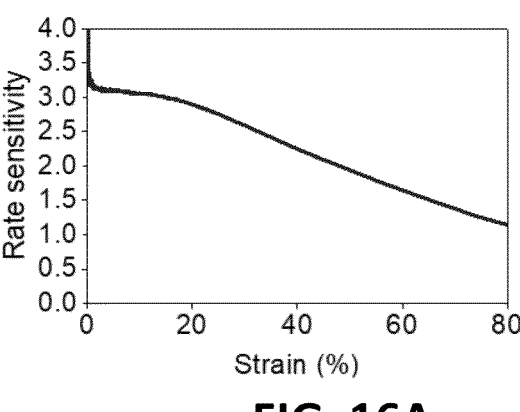
FIGS. 16A to 16E are rate sensitivity-strain graphs of rate-sensitive protective apparels according to some embodiments of the present invention, respectively.
Figure 16B:
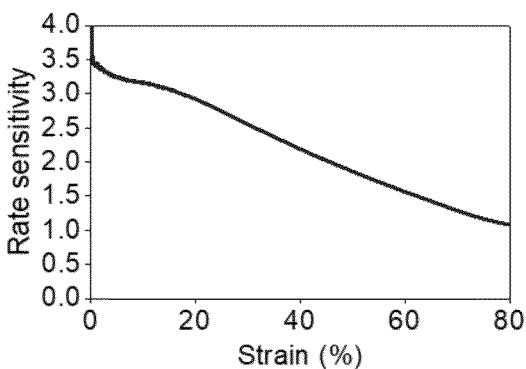
Figure 16C:
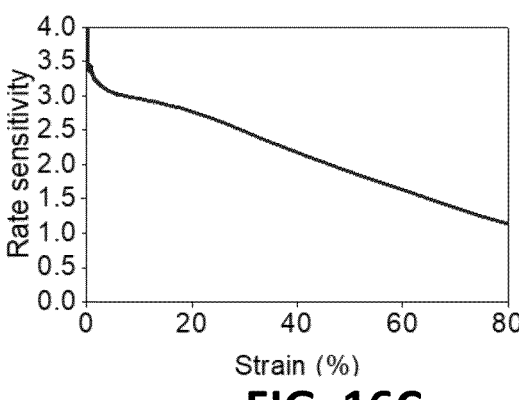
Figure 16D:
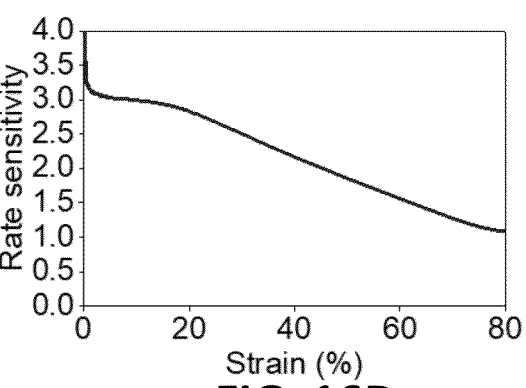
Figure 16E:
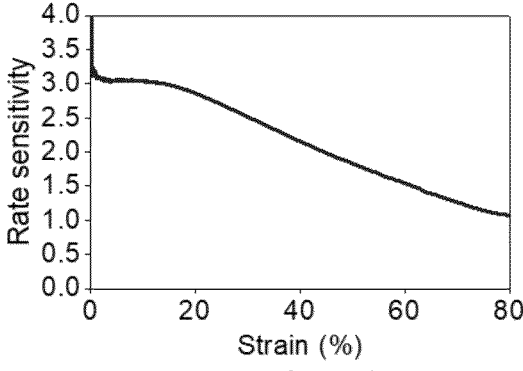

Referring to FIGS. 15A to 15E, the stress-strain results of the rate-sensitive protective apparel samples are presented. These rate-sensitive protective apparels, labeled as S1 to S5, have 12-mm long fibers and have undergone both silane coupling agent treatment and surface modification. In each stress-strain graph, the upper curve represents the result of the 500 mm/min test, while the lower curve represents the result of 50 mm/min test. Shifting to FIGS. 16A to 16E, the rate sensitivity of rate-sensitive protective apparels S1 to S5 is plotted and displayed. Within each graph, a benchmark value of 3.0 is indicated by a broken line. Overall, rate-sensitive protective apparels S1 to S5 exhibit excellent rate sensitivity, exceeding 3.0. Notably, sample S2, as depicted in FIGS. 15B and 16B, shows a particularly desirable rate sensitivity of approximately 3.5.

Table 2 shows the results of a drop ball test on the rate-sensitive protective apparels S1 to S5. The initial impact force is approximately 2500 N, and the average transmitted force (ATF) is recorded by the force sensor under the sample. The drop ball test provides the information about the force reduction of the rate-sensitive protective apparels S1 to S5. In general, the rate-sensitive protective apparels S1 to S5 exhibit force reduction greater than 65%. The rate-sensitive protective apparel S4 exhibits force reduction to almost 80% upon an impact force.

TABLE 2

| Sample | Thickness (mm) | ATF (N) | Force Reduction |
|---|---|---|---|
| S1 | 2.38 | 793 | 68% |
| S2 | 2.16 | 698 | 72% |
| S3 | 2.40 | 860 | 66% |
| S4 | 2.41 | 562 | 78% |
| S5 | 2.53 | 648 | 74% |

Figure 17A:
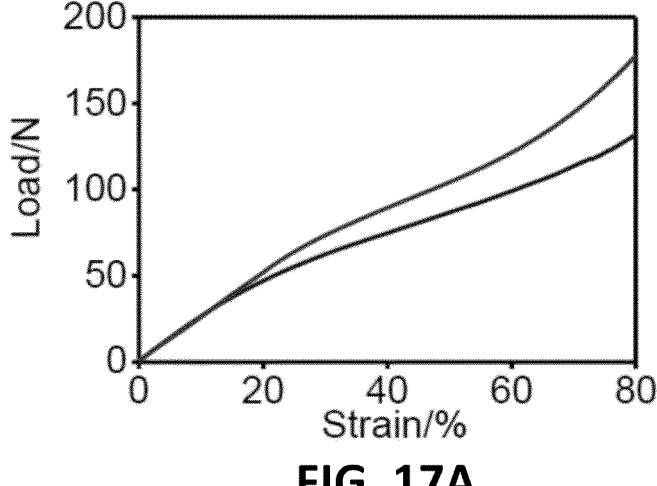
FIGS. 17A and 17B show stress-strain graphs of apparels with or without shear thickening fluid core, respectively.
Figure 17B:
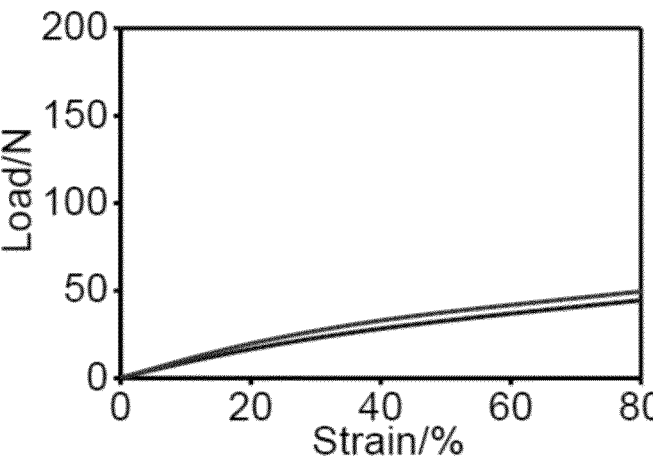

Referring to FIGS. 17A and 17B, the property of apparels with and without shear thickening fluid core is tested. In FIG. 17A, the apparel has a shear thickening fluid core, with the upper curve indicating stretching at 500 mm/min, and the lower curve representing stretching at 50 mm/min. In FIG. 17B, the apparel lacks a shear thickening fluid core, and the upper curve representing stretching at 500 mm/min, while the lower curve representing stretching at 50 mm/min. It is evident that the apparel with the shear thickening fluid core exhibits greater sensitivity to stretching.

Figures 18A, 18B, 18C, 18D:
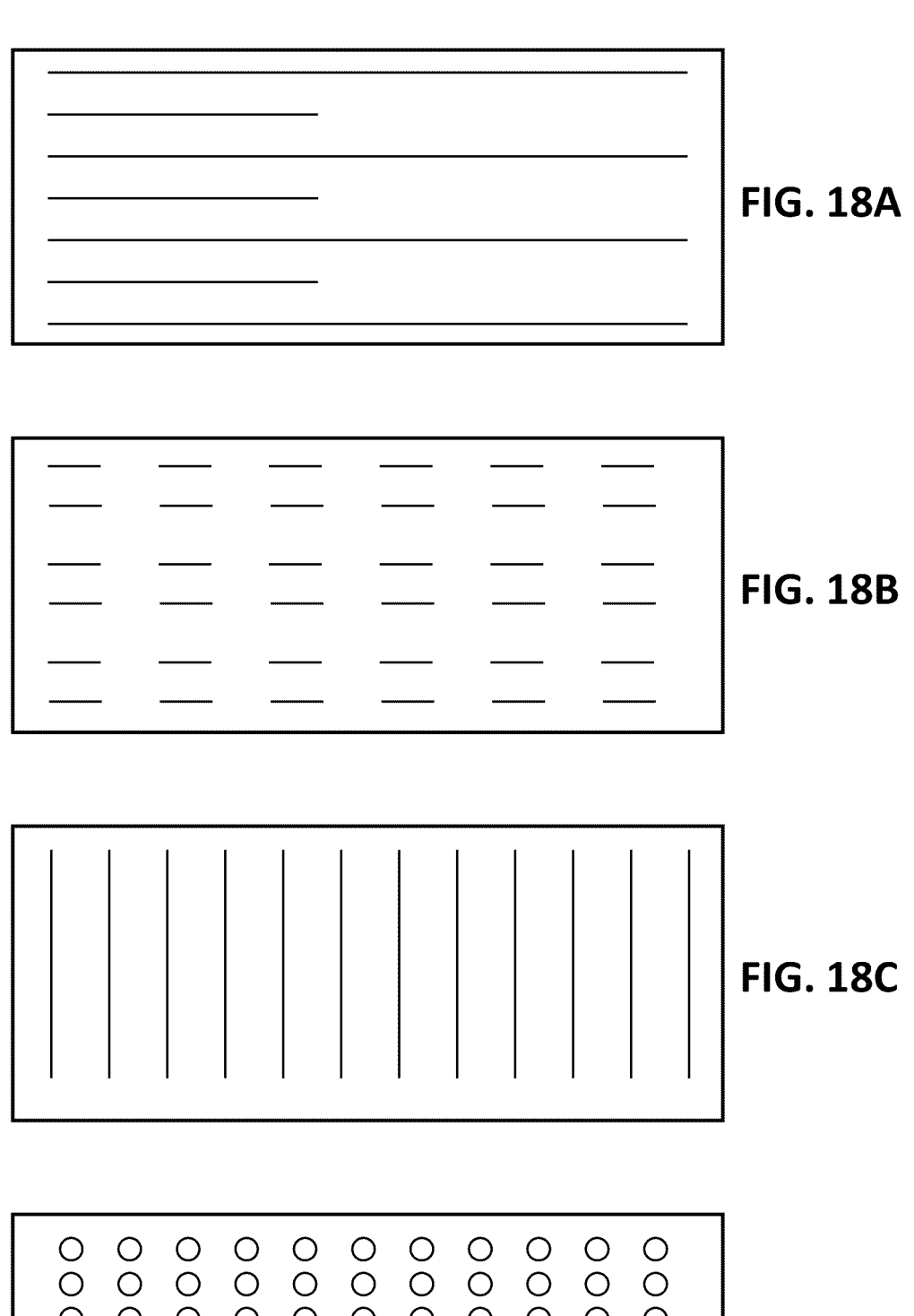
FIGS. 18A to 18D are schematic diagrams showing texture patterns of rate-sensitive protective apparels according to some embodiments of the present invention.
Figures 19A, 19B, 19C, 19D:
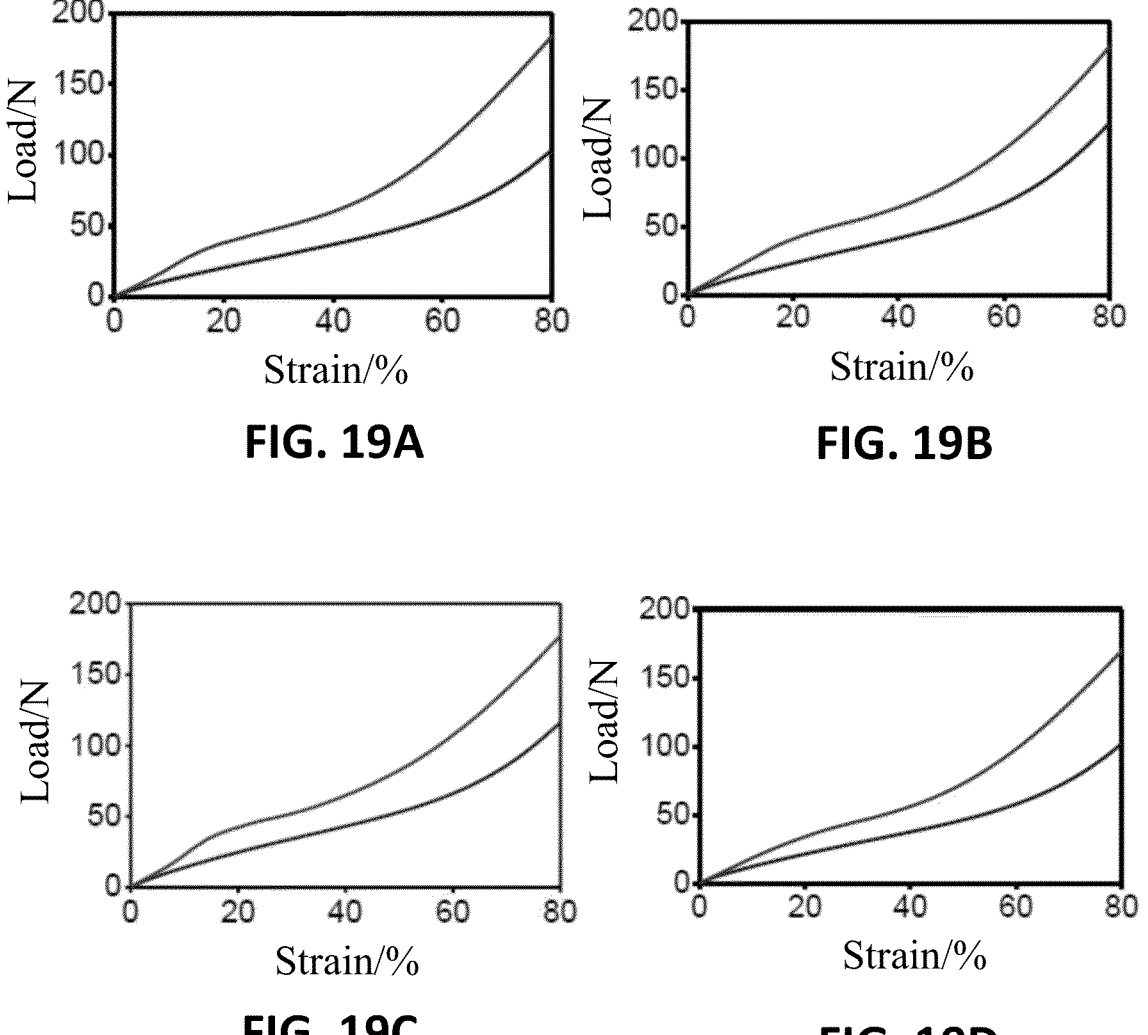
FIGS. 19A to 19D are stress-strain graphs of rate-sensitive protective apparels according to some embodiments of the present invention, respectively.

Turning to FIGS. 18A to 18D, different texture patterns made by blade coating on the outer fabric shell and the sealing material layer are presented. In FIG. 18A, the pattern includes parallel long and short lines arranged alternatively. In FIG. 18B, the pattern is dense dashes in an array. In FIG. 18C, the pattern is parallel straight lines spanning across the width of the outer fabric shell and the sealing material layer. In FIG. 18D, the pattern is densely packed dots in an array.

Turning to FIGS. 19A to 19D, the stress-strain properties of different texture patterns are examined through stretching test.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A rate-sensitive protective apparel comprising:

an outer fabric shell;

a first sealing material layer positioned within the outer fabric shell;

a second sealing material layers positioned within the outer fabric shell; and a shear thickening fluid core disposed between the first and second sealing material layers, wherein the first and second sealing material layers have fibers extending towards an apparel interior and enmeshing the shear thickening fluid core, and the shear thickening fluid core comprises a shear thickening fluid and the shear thickening fluid directly contacts the first sealing material layer and its fibers and the second sealing material layer and its fibers; and wherein the outer fabric shell has a width greater than the first sealing material layer, the second sealing material layer, and the shear thickening fluid core.

2. The rate-sensitive protective apparel of claim 1, wherein the first and second sealing material layers have been treated with a coupling agent selected from 3-triethoxysilylpropyl isocyanate and 3-aminopropyltriethoxysilane.

3. The rate-sensitive protective apparel of claim 1, wherein the first and second sealing material layers have been treated with 2-hydroxyethyl acrylate.

4. The rate-sensitive protective apparel of claim 1, wherein each of the fibers has a length ranging from 1 to 12 mm.

5. The rate-sensitive protective apparel of claim 1, wherein the fibers have a density on the first and second sealing material layers ranging from 1 to 20 per $cm^2$.

6. The rate-sensitive protective apparel of claim 1, wherein the shear thickening fluid core comprises nanoparticles or nanowires suspended in a polyethylene glycol.

7. The rate-sensitive protective apparel of claim 6, wherein a mass ratio of the nanoparticles or nanowires and the polyethylene glycol ranges from 1:1 to 2.5:1.

8. The rate-sensitive protective apparel of claim 1, wherein the first and second sealing material layers are selected from silicone, latex, neoprene rubber, styrene-butadiene rubber, EPDM rubber, and a combination thereof.

9. The rate-sensitive protective apparel of claim 1, wherein the outer fabric shell is an elastic fabric.

* * * * *